United States Patent [19]

Siegel et al.

[11] Patent Number: 4,995,151
[45] Date of Patent: Feb. 26, 1991

[54] APPARATUS AND METHOD FOR HYDROPATTERNING FABRIC

[75] Inventors: Jodie M. Siegel, Watertown, Mass.; Herschel Sternlieb, Brunswick, Me.; Timothy J. Connolly, Norwood; J. Michael Greenway, Westwood, both of Mass.; D. A. Parker, Somers, Conn.; Arlene T. Simon, Dorchester, Mass.

[73] Assignee: International Paper Company, Purchase, N.Y.

[21] Appl. No.: 411,491

[22] PCT Filed: Apr. 14, 1989

[86] PCT No.: PCT/US89/01585
§ 371 Date: Jul. 17, 1989
§ 102(e) Date: Jul. 17, 1989

[87] PCT Pub. No.: WO89/09850
PCT Pub. Date: Oct. 19, 1989

Related U.S. Application Data

[63] Continuation-in-part of Ser. No. 81,284, Apr. 14, 1988, Pat. No. 4,960,630.

[51] Int. Cl.$^5$ .................. D06B 5/08; D06C 23/00
[52] U.S. Cl. ...................... 26/69 R; 28/169
[58] Field of Search .............. 26/69 R; 28/169, 104, 28/105, 106

[56] References Cited

U.S. PATENT DOCUMENTS

| | | |
|---|---|---|
| 2,241,222 | 5/1941 | Sonnino . |
| 3,088,859 | 5/1963 | Smith .................. 28/106 X |
| 3,256,581 | 6/1966 | Thal et al. . |
| 3,403,862 | 10/1968 | Dworjanyn . |
| 3,434,188 | 3/1969 | Summers ................... 28/104 |
| 3,523,346 | 8/1970 | Bolen et al. ................. 26/28 |
| 3,537,945 | 11/1970 | Summers ............... 428/292 X |
| 3,613,186 | 10/1971 | Mazzone et al. ............. 26/69 R |
| 3,635,625 | 1/1972 | Voss .................... 425/135 |
| 3,750,236 | 8/1973 | Kalwaites . |
| 3,769,659 | 11/1973 | Kalwaites . |
| 4,156,957 | 6/1979 | McKay . |
| 4,233,349 | 11/1980 | Niederhauser ............... 28/104 X |
| 4,364,156 | 12/1982 | Greenway et al. . |
| 4,379,799 | 4/1983 | Holmes .................. 28/104 X |
| 4,393,562 | 7/1983 | Stokes .................. 26/69 R |
| 4,418,451 | 12/1983 | Crenshaw . |
| 4,471,514 | 9/1984 | Stokes . |
| 4,497,095 | 2/1985 | Minemura et al. . |
| 4,499,637 | 2/1985 | Greenway . |
| 4,693,922 | 9/1987 | Buyofsky et al. ............. 28/105 X |
| 4,718,152 | 1/1988 | Suzuki et al. ............... 28/104 |
| 4,767,584 | 8/1988 | Siler .................... 425/385 X |

FOREIGN PATENT DOCUMENTS

| | | |
|---|---|---|
| 0177277 | 9/1986 | European Pat. Off. . |
| 368145 | 6/1941 | Japan . |
| 46-9876 | 3/1971 | Japan . |
| 61-6368 | 1/1986 | Japan . |
| 62-28466 | 2/1987 | Japan . |
| 62-55253 | 3/1987 | Japan . |
| 62-69866 | 3/1987 | Japan . |
| 62-149961 | 7/1987 | Japan . |

*Primary Examiner*—Werner H. Schroeder
*Assistant Examiner*—Bradley K. DeSandro
*Attorney, Agent, or Firm*—Frank J. Clark

[57] ABSTRACT

An hydropatterning apparatus and method conveys a sheet of fabric (12) through a patterning station (16) along a machine direction on a conveyor (24), preferably a drum, having a support surface (16, 60) formed with a pattern of raised or solid areas (16a) and lowered or void areas (16b), and has one or more manifolds (30) of hydrojet nozzles (32) disposed above the conveyor for directing a continuous curtain of fluid (40) downwardly to impact on the fabric so that properties of the fabric become altered in correspondence to the pattern of the support surface (16, 60). Fabric colored with a non-colorfast dye is hydropatterned by subtractive color removal to obtain a patterned washout effect. Alternatively, a support surface having raised or embossed areas is used to obtain a fiber displacement, lace-like effect in light fabrics. The disclosed hydropatterning technique is particularly suitable for producing a color washout effect in indigo dyed denim.

20 Claims, 12 Drawing Sheets

APPARATUS AND METHOD FOR HYDROPATTERNING FABRIC

This is a continuation-in-part of application Ser. No. 07/181,284 filed Apr. 4, 1988, now U.S. Pat. No. 4,960,630.

FIELD OF THE INVENTION

This invention generally relates to a method and apparatus for producing a visual pattern or other patterned effect in fabric, and more particularly, for producing a pattern through treatment with water.

BACKGROUND OF THE INVENTION

It has become desirable to impart a visual pattern or other patterned effect on some types of fabrics. For example, it is desireable to produce a washed-out, distressed, or pre-worn effect on dyed denim fabrics. Dyeing and dye printing are normally additive processes where dyes or pigments are added to natural, white, or previously dyed fabrics. Creating distressed or pre-worn surface effects is generally a subtractive process of removing color from the dyed fabric. Several subtractive, dyed fabric treatment processes are known in the art, but have been found to be unsatisfactory for various reasons.

For example, discharge printing is a subtractive printing process where fabric is piece-dyed and then printed with a paste of caustic soda and sodium hydrosulfite to destroy the color in the printed areas. The caustic paste used to remove the base color must be thoroughly washed out, or it can have a serious deteriorating effect on the fabric.

Acid washing is a chemically induced, subtractive process which removes color from fabric already cut and sewn into garments. Acid washed effects are achieved by soaking pumice stone in chlorine bleach, which are then added to a load of denim garments in an industrial washing machine without water. The load of stones and garments is agitated for a length of time based upon the degree of "frosting" or color removal desired, e.g. from one to several hours. The effect of the acid coupled with the abrasion caused by the stones is extremely detrimental t fabric strength and durability.

Stone washing is a mechanical, color subtractive process achieved by a combination of crocking, abrasion, and lack of color fastness to washing. Here denim garments are loaded into industrial washers along with water and pumice stones and agitated for a predetermined length of time. The degree of washout can be somewhat controlled by the length of the agitation cycle, however, the overall effect is the end result of substantially random processes. The fabric is subject to less abuse and deterioration in stone washing than in acid washing. However, for both stone and acid washing, the washout patterning of the fabric cannot be precisely controlled and made repeatable from load to load. In both cases the wash equipment is subjected to extremely hard beating caused by the tumbling and crumbling of the pumice stone Acid washing and other chemical treatment of fabrics generate large amounts of contaminated or caustic effluents which are discharged to the environment. It is highly desireable to find ways to reduce the amounts of polluted effluents that are discharged to the environment.

In order to overcome the disadvantages of the prior art, it is a principal object of the invention to provide an apparatus and related method for producing a visual pattern or other effect on fabric which minimizes abuse and deterioration of the process equipment, as well as the fabric being processed. In particular, it is a specific object to obtain subtractive color patterning of woven fabric by non-caustic fluid treatment which does not wear down and damage the process equipment and deteriorate the fabric. It is a further object to pattern fabric through a process which reduces the amounts of polluted effluents that are discharged to the environment.

SUMMARY OF THE INVENTION

The present invention encompasses an hydropatterning apparatus comprising a conveyor for conveying a sheet of fabric through a patterning station along a machine direction, the conveyor including a support surface formed with a pattern of solid areas and void areas interspersed therein, wherein the fabric is placed flat in contact with the support surface as it is carried through the patterning station; hydrojet means disposed above the conveyor for directing a curtain of fluid downwardly to impact on the fabric as it is moved through the patterning station on the support surface, wherein said curtain of fluid is substantially continuous across the fabric and is controlled such that a visual property of the fabric become altered in correspondence to the pattern of solid areas and void areas of the support surface due to the impact of the fluid curtain on the fabric against the patterned support surface. The invention also includes a process for hydropatterning fabric as in the above-described apparatus, as well as the patterned fabric product produced by such process.

In the preferred form of the invention, the hydropatterning apparatus includes a plurality of manifolds mounted in parallel along the periphery of a conveyor drum forming a series of curtains of water under which the fabric is conveyed, each manifold including a plurality of nozzles, distributed in the cross direction perpendicular to the machine direction, which eject divergent, overlapping jets of water so that the water curtain impacts substantially evenly across the width of the fabric. The nozzles preferably have wide divergent openings s that they do not become clogged with fibers from the fabric and other debris, have angles of divergence in the range of 2 to 45 degrees, and are disposed about 1 to 10 inches above the conveyor. Preferred results are obtained using water pressures of about 1000 psi at process speeds of 60 ft/min, and with energy of 0.4 to 2.0 hp-hr/sq-yd.

A specific application for the present invention is the hydropatterning of dyed woven fabric obtained by washing color from areas of the fabric in contact with the solid areas of the patterned support surface. The support surface is formed with a pattern of solid and void areas corresponding to the washout pattern to be obtained on the fabric. The void areas preferably occupy approximately 25 percent of the overall pattern area.

A further application for the present invention is the hydropatterning of fabric obtained by displacement of yarn or fiber in repeating patterns in the fabric. Light density or loosely woven fabrics are subjected to the above-described hydrojet treatment while in contact with a support surface having a pattern of raised areas, such as domes, or three-dimensionally embossed or relief-patterned woven screens. Visual effects such as ribbing, wavy lines, checkering, geometric or floral designs, or lacework can be obtained. Hydropatterned fiber displacement can be applied to dyed or undyed woven or knitted fabrics, as well as to nonwoven and stitch-bonded fabrics.

Other objects, features, and advantages of the present invention will become apparent from the following detailed description of the best mode of practising the invention when considered with reference to the drawings, as follows:

PREFERRED EMBODIMENTS OF THE INVENTION

The hydropatterning apparatus and related method and products of the invention obtain a controllable and repeatable visual pattern in fabric by the application of a non-caustic fluid under pressure to the fabric carried in contact with a patterned support surface. The invention as described herein applies a continuous curtain of water to obtain a subtractive, color washout effect in dyed woven fabrics, such as in warp dyed denim with indigo dyestuff, and fiber displacement patterns in light density or loosely woven fabrics. However, it should be understood that the principles of the invention may be applied to other applications besides color washout and fiber displacement, may employ other non-caustic fluids besides water, and may be used with other types of fabrics, including nonwoven fabrics.

Figure 1:
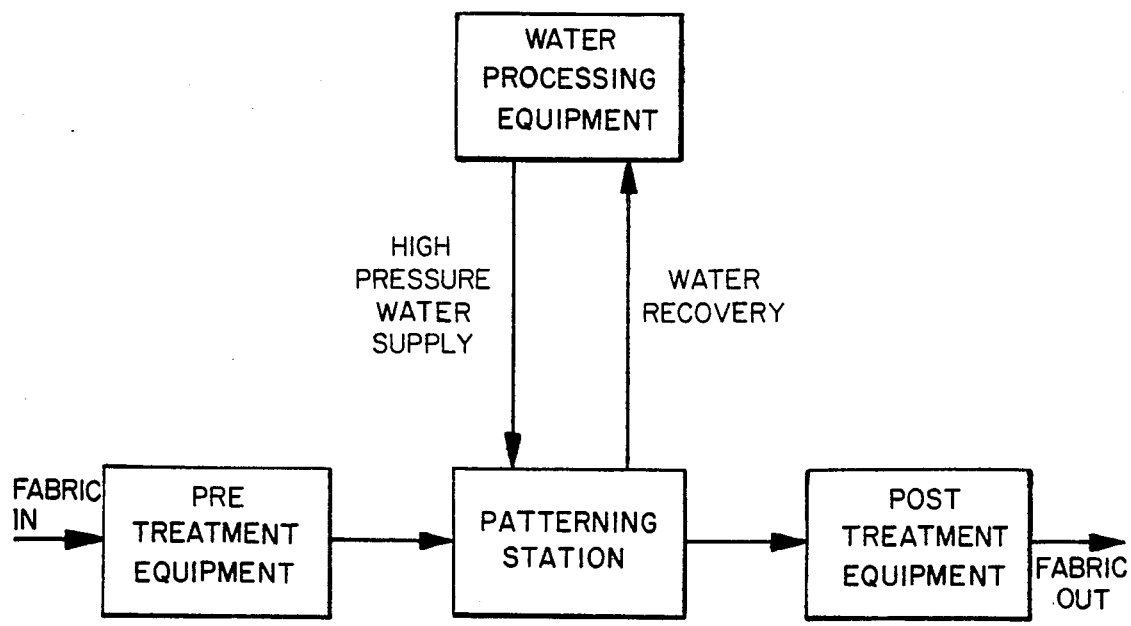
FIG. 1 is a schematic diagram of the process steps for hydropatterning fabric in accordance with the invention.

Referring to the general process steps of the invention as illustrated in FIG. 1, incoming fabric is subjected to any required pre-treatment, such as dyeing with dyestuff to obtain a base color level. The pre-treated fabric is then subjected to the hydropatterning treatment of the invention at a patterning station, which receives a supply of high pressure water from and returns recovered water to the associated water processing equipment. The patterned fabric from the patterning station is then subjected to any required post-treatment, such as drying under tension on conventional tenter frames, to obtain the final fabric product.

In the following description of one embodiment of the hydropatterning apparatus, a continuous sheet of dyed woven fabric is subjected to hydropatterning treatment to produce a color washout effect. The dyeing of woven fabric is deemed to be well known to those skilled in the art. The type of dyestuff and method of dyeing plays an important role in the patterning effect to be obtained. For dyed denim, indigo dye is preferred for its surface or layered characteristic, i.e. not being fast to washing, which produces patterned effects by the removal of dye from the surface of the yarns in discrete areas. The indigo dye is typically applied by passing yarns from a warp beam through a series of 5 to 8 dye baths to form a number of dye coats on the surface of the fibers.

Figure 2:
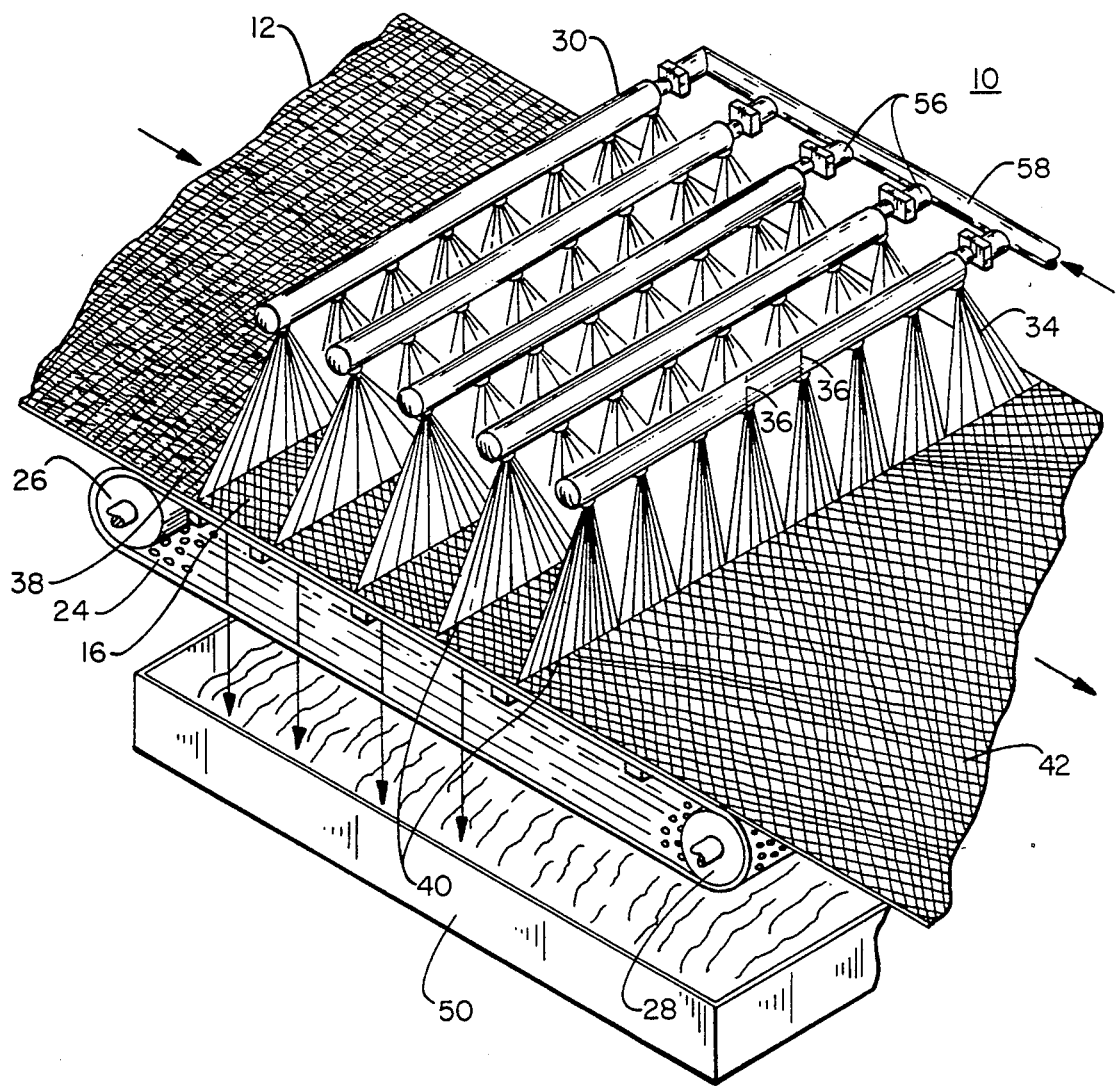
FIG. 2 is a perspective view illustrating one embodiment of hydropatterning apparatus for carrying out the invention.

Referring now to one preferred form of hydropatterning apparatus shown in FIG. 2, the patterning station 10 includes an endless conveyor 24 driven by rollers 26, 28 for advancing the fabric 12 in a machine direction (arrow indicating a downstream direction). Preferred line speeds for the conveyor are in the range of 10 to 500 ft/min. The conveyor 24 presents a generally planar support surface 16 in the patterning zone which is formed with a plain weave pattern of solid (or raised) and void (or lowered) areas, e.g. grid, honeycomb, diamond, striated, etc. The fabric is supported in contact with the solid or raised areas of the pattern, while the void areas drain away the water applied to the fabric, as described further below. In the preferred embodiments, the void areas occupy approximately 25 percent of the overall pattern area. The fabric 12 in FIG. 2 has a different cross-hatching at the exit end 42 from the incoming fabric at the entry end 38 to indicate that it has been altered by the hydropatterning process.

Mounted above the conveyor 24 is an arrangement of manifolds 30 spaced apart in parallel and aligned in a cross direction of the fabric which is perpendicular to the machine direction. The manifolds 30 are spaced approximately 4 inches apart, and are positioned at least 1.0 inch, and preferably in the range of 1 to 10 inches above the conveyor. Each manifold has a row of water jet nozzles 36, spaced along the cross direction, which ejects a divergent fan jet 34 of water downwardly on the fabric 12. The fan jets 34 overlap to form a continuous curtain 40 of water which impacts substantially evenly across the width of the fabric. This produces an even pressure of water on the fabric against the patterned support surface in order to avoid streaking or otherwise uneven patterning.

The manifolds are designed to deliver fluid pressures to the nozzles 36 in the range of 200 to 2500 psi. The nozzles of the manifold are spaced approximately 1 inch apart and are positioned 1 to 10 inches above the conveyor 24. The fan jets 34 diverge in a fan-shape having an angle of divergence in the cross direction relative to the nozzle axis which is perpendicular to the conveyor surface. The angle of divergence may be from 2 to 45 degrees, and experimentation has shown that a divergence angle of about 18 degrees yields an optimum fan shape and an even curtain of water pressure. The output energy of the curtain of water is preferably in the range of 0.4 to 2.0 hp-hr/sq-yd of fabric, and particularly 1.0 hp-hr/sq-yd. In the case of heavier fabrics such as denim, the energy applied to the surface of the fabric may be a surface effect and therefore independent of weight.

Preferred nozzles for use in the invention are of the type manufactured by Spraying Systems Co., distributed by J. W. Snowden & Associates, Manchester, N.H., under product designation 0503-TC. This nozzle has a tungsten carbide spray tip which has been found effective for providing regulated pressure sprays. The ejection orifices in the nozzle have a non-circular shaped configuration. The preferred nozzle has an effective diameter of about 0.43 inches and flow rate of 1.5 gallons/min with an effective jet spray angle of approximately 18 degrees and 1000 psi.

Figure 3:
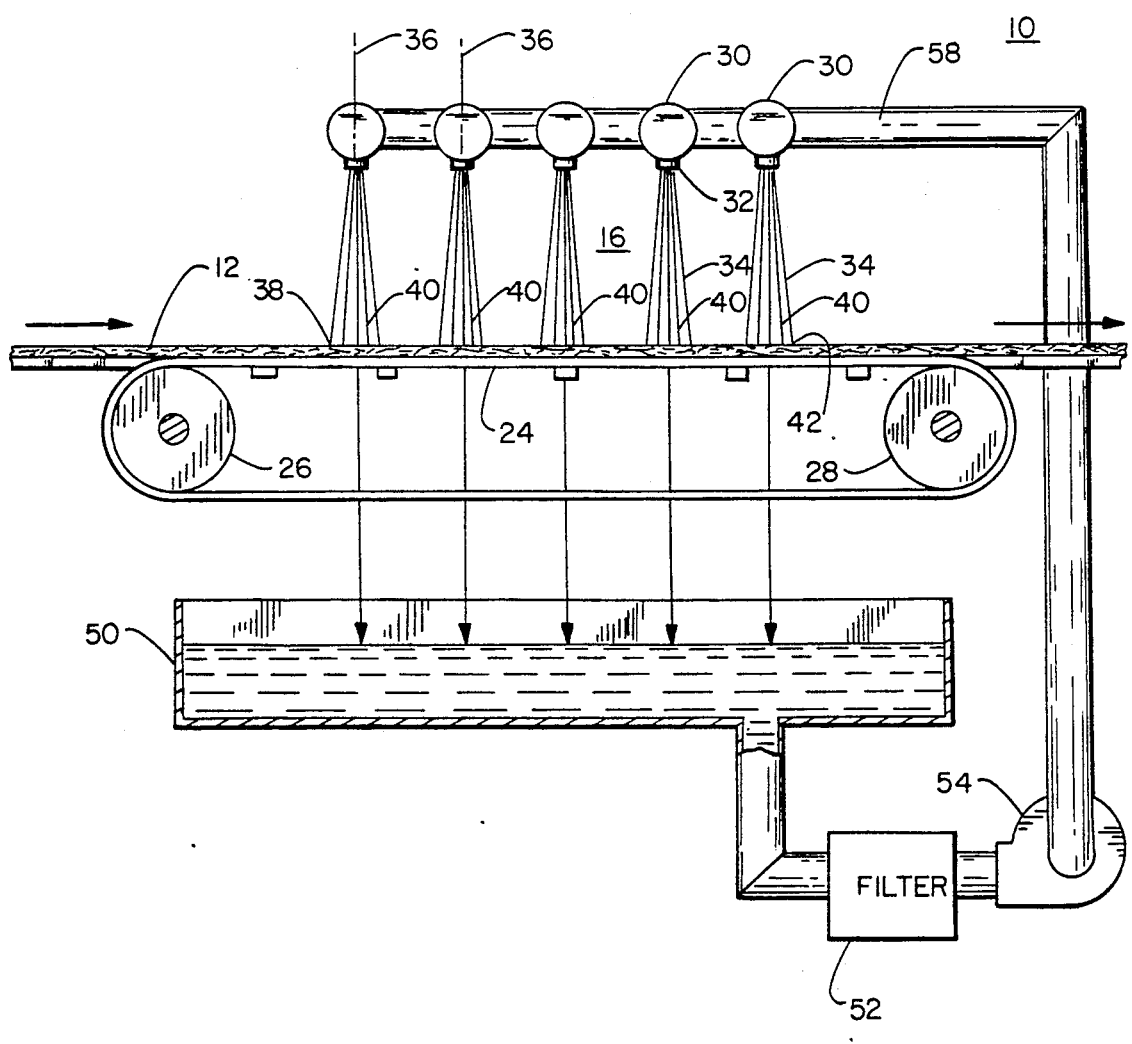
FIG. 3 is a side schematic view of the hydropatterning apparatus illustrated in FIG. 2.

As shown in FIG. 3, as the fabric is moved on the conveyor 24 through the series of water curtains 40, the water impacts on the fabric against the raised or solid areas of the patterned support surface. It is found that a dye which lacks a certain degree of color fastness, such as indigo dye, will wash out from the fabric in the raised or solid areas at least partially under the pressure of the water curtains. The water and carried-away dye is drained through the void areas of the support surface to a collecting tank 50 below the conveyor 24. A filter 52 is provided to remove dislodged fibers and other debris, and a recirculating pump 54 returns the water under pressure to the manifolds 30. The washed out dye may be removed by the use of settling tanks.

Figure 4:
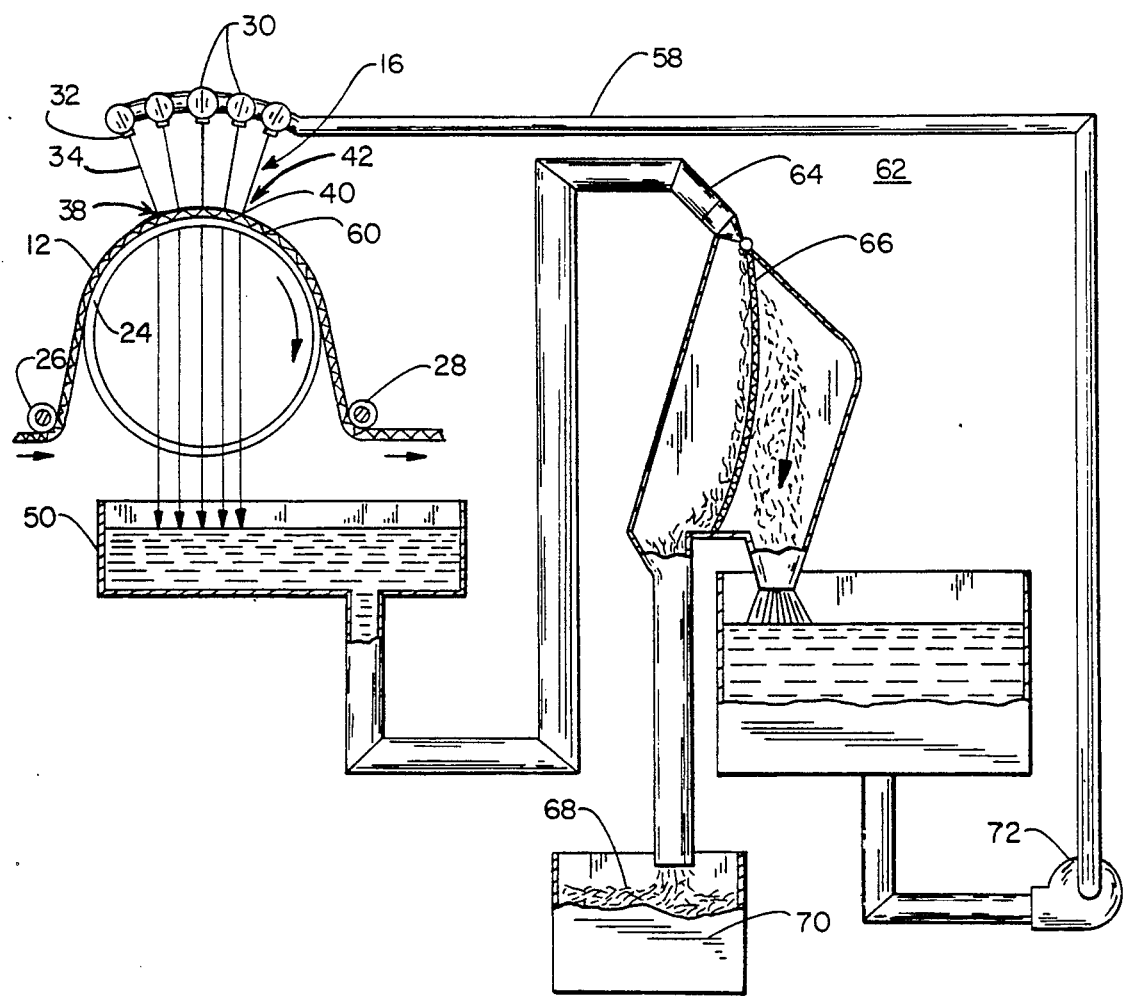
FIG. 4 is a side schematic view of another embodiment of the hydropatterning apparatus.

A preferred conveyor structure is shown in FIG. 4 employing a cylindrical or drum conveyor 24 and patterned support surface 60. The manifolds 30 are arranged in close proximity at the upper part of the circumference of the support member. In its other aspects, the operation of this embodiment is similar to the first described embodiment, although the drum conveyor is found to provide preferred results. The water processing equipment in this embodiment includes a filtration system of the type manufactured by Dore Oliver Inc., Stamford, Conn., under product designation 120 DSM Screen. The DSM system has a dispensing nozzle 64 and filter screen 66 which directs fiber debris into discharge receptacle 70, while the filtered fluid is diverted to be recirculated through pump 72. A settling tank is used for dyestuff recovery, although it is not shown in the drawing.

Figure 5A:
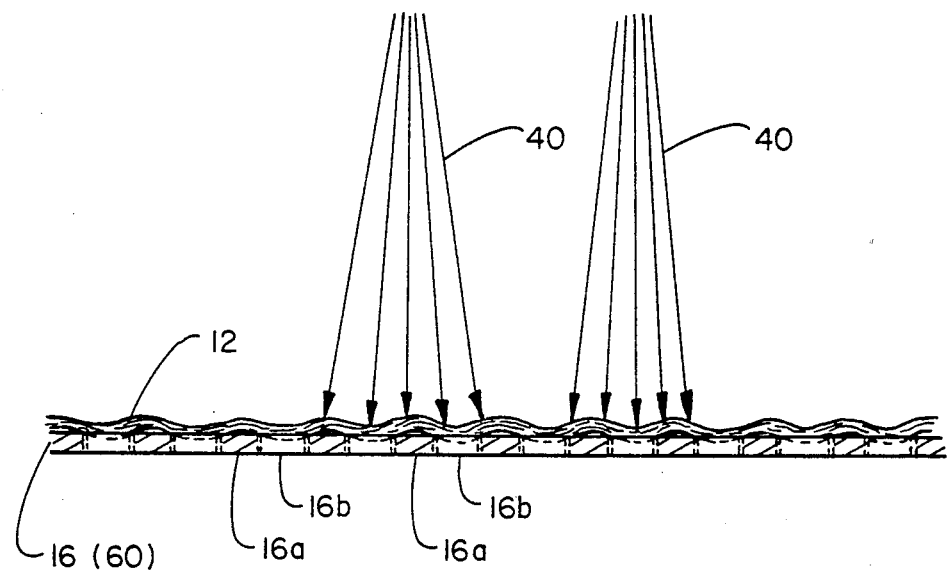
FIG. 5A is a sectional view showing a planar support surface for hydropatterning fabric which has a pattern of void and solid areas suitable for color washout effects.

In FIG. 5A, a side sectional view illustrates the washout patterning function of the water curtains 40 impacting downward on the fabric 12 carried on the support surface 16 (60). The support surface has a pattern of solid areas 16a and void areas 16b, such as may be produced by a honeycomb or evenly perforated pattern in a screen. The pressure of the water jets presses the fabric 12 against the support surface so that portions of it are supported on the solid areas 16a and other portions are depressed into the void areas 16b. It is found that, for a dyed fabric, the dye tends to wash out from the raised portions supported on the solid areas 16a, and to drain into and to be retained in the depressed portions in the void areas 16b, thereby producing a color washout pattern corresponding to the pattern of the support surface.

Figure 6A:
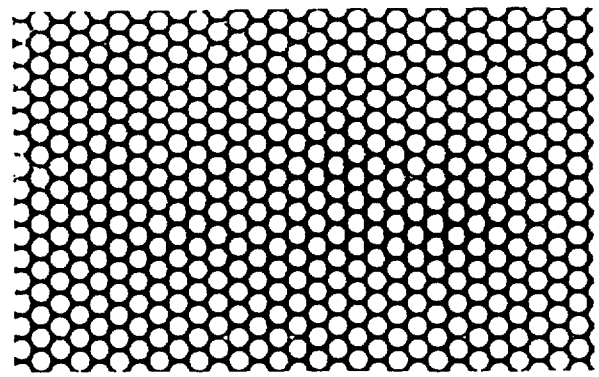
FIGS. 6A to 6K are photographs of support surface patterns and the resulting dye washout effects obtained in the fabric in accordance with the invention.
Figure 6B:
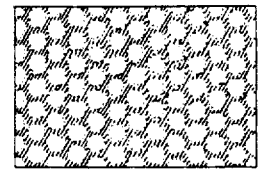
Figure 6C:
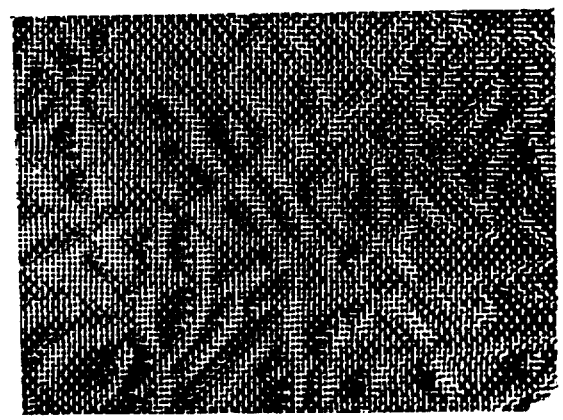
Figure 6D:
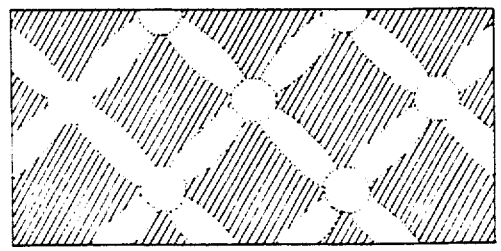
Figure 6I:
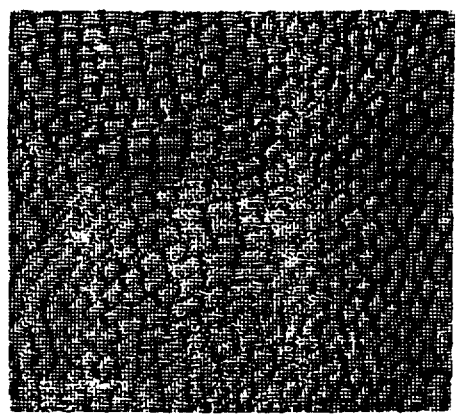
Figure 6J:
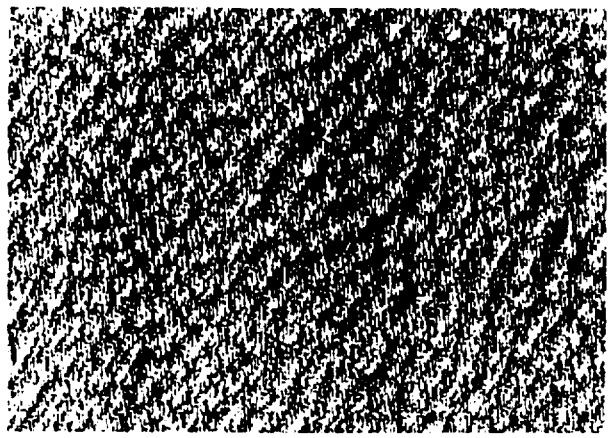
Figure 6K:
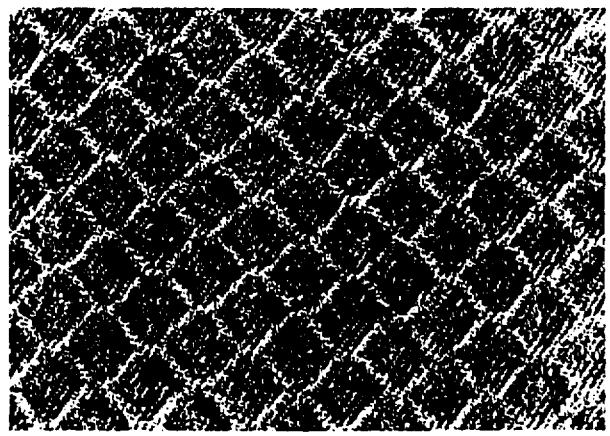

In FIGS. 6A to 6K, examples of several patterned support surfaces and the resulting pattern effect obtained on the fabric are shown. Generally, the support surface is formed out of fine wire mesh in which raised areas are formed in a repeating pattern, or from a metal plate in which void areas are perforated. In FIG. 6A the support surface was a perforated metal plate with round void areas, and the resulting fabric is shown in FIG. 6B having a stippled washout effect. The support surface in FIG. 6C is a wire mesh embossed with a repeating flower pattern, and the resulting patterned fabric is shown in FIG. 6D. The wire mesh employed a basket weave embossing in FIG. 6E, with the result in FIG. 6F, a plaid embossing in FIG. 6G, with the result in FIG. 6H, a lines/dots embossing in FIG. 6I, with the result in FIG. 6J. The patterned result of a wire mesh drum embossed with a honeycomb pattern is shown in FIG. 6K.

Besides retaining the washout pattern, the resulting fabrics can also retain a three-dimensional embossed effect corresponding to the pattern of the support surface due to the pressure of the water at the hydropatterning station forcing the fabric into the open areas of the screen or plate. The patterned fabrics may be treated with sizing or other stiffeners or heat setting to make the embossed effect more permanent. The embossed effect can be obtained alone, without the washout effect, by using dyestuff which is more color fast than indigo or other vat dyes.

Figure 5B:
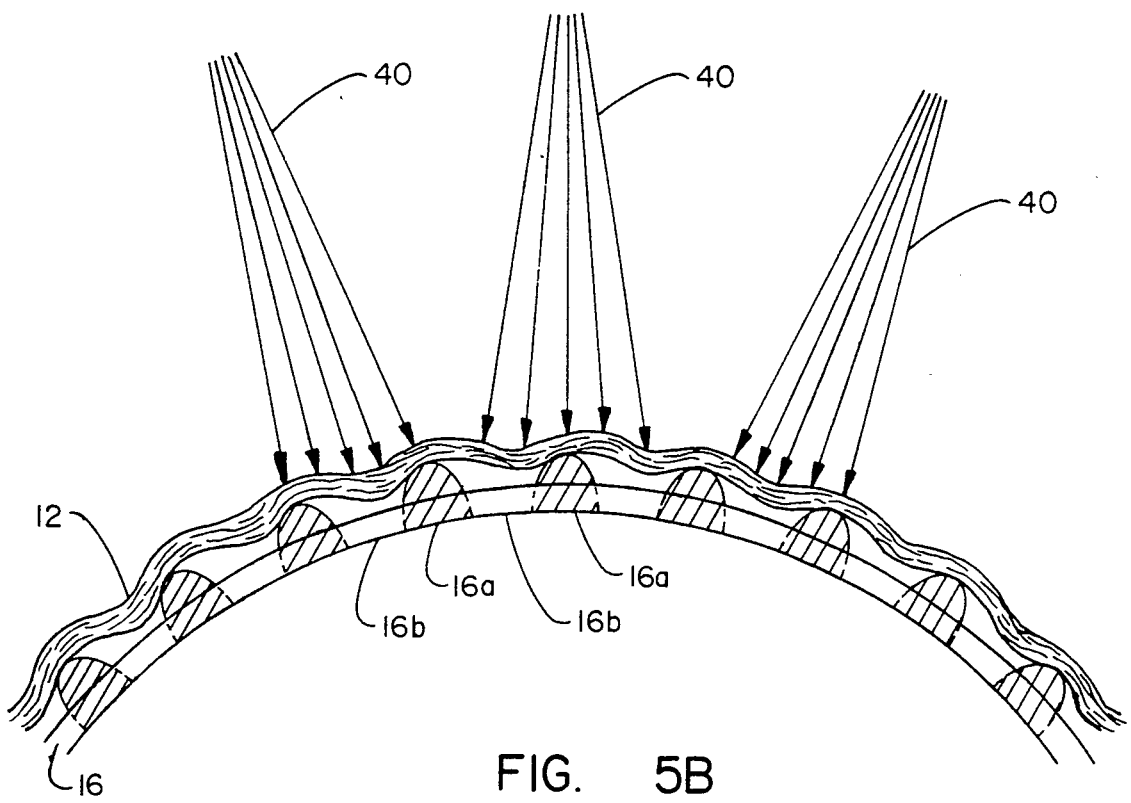
FIG. 5B is a sectional view of a drum support surface which has a pattern of domes and depressed areas suitable for fiber displacement effects.

In FIG. 5B, a side sectional view illustrates the fiber displacement patterning function of the water curtains 40 impacting downward on the fabric 12 carried on the drum support surface 16 (60). The drum support surface has a three-dimensionally embossed or woven relief pattern of raised or embossed areas 16a, such as in the shape of domes, and void areas 16b. The pressure of the water jets presses the fabric 12 against the support surface so that portions of it are forced against the domed areas 16a and other portions are depressed into the lowered or void areas 16b. The drum support surface is preferred for both color washout and fiber displacement effects. It is found that, for light density or loosely woven fabrics, the fibers are displaced by the action of the water and become entangled together at crossover points. The yarns are thus locked together, creating open areas or lace-like fabric with good cohesion and stability. The fabric also exhibits good drape and hand, because it is such an open fabric, yet has limited yarn slippage due to the locking together of the fibers during hydropatterning. The patterning is most effective in lightweight fabrics with fine to moderate size yarns. Such patterns can include ribbing, wavy lines, checkering, geometric or floral designs, or lacework effects. The use of higher energy water curtains or treating the patterned fabrics with sizing can make the displacement effect more permanent.

Figure 7A:
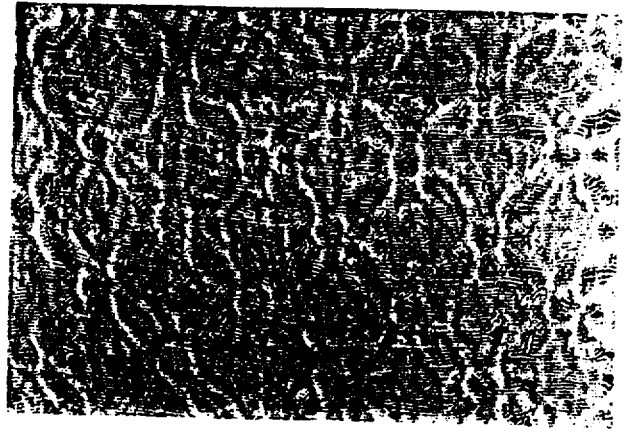
FIGS. 7A to 7L are photographs of support surface patterns and the resulting fiber displacement effects obtained in the fabric.
Figure 7B:
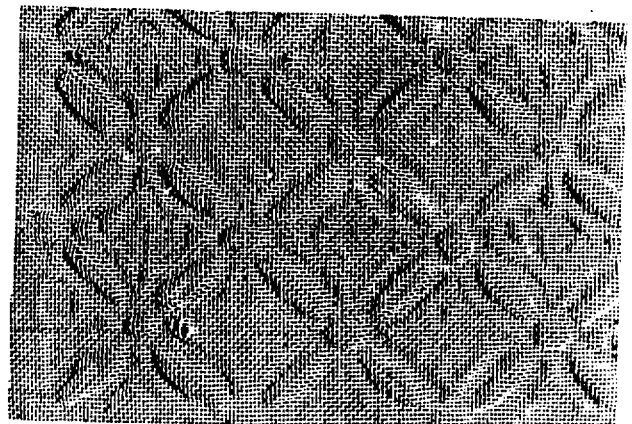
Figure 7C:
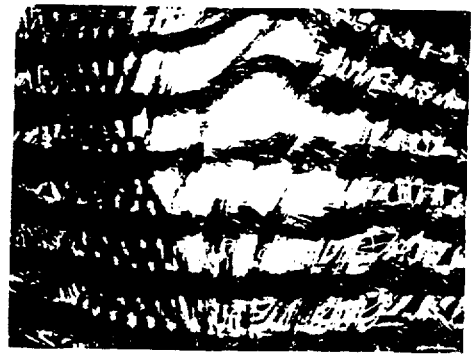
Figure 7D:
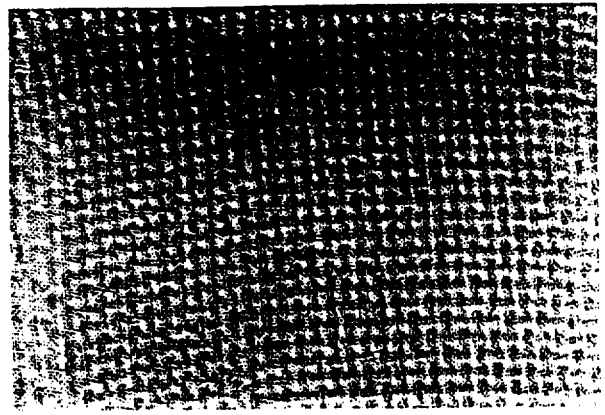
Figure 7E:
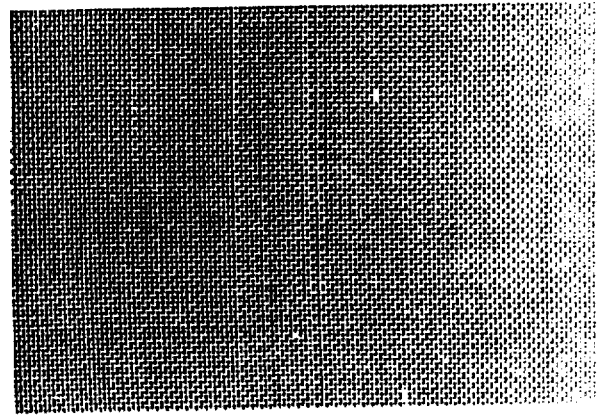
Figure 7F:
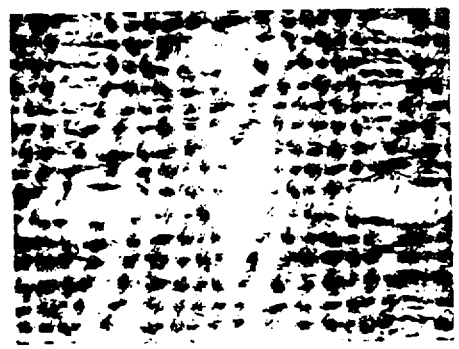
Figure 7A:
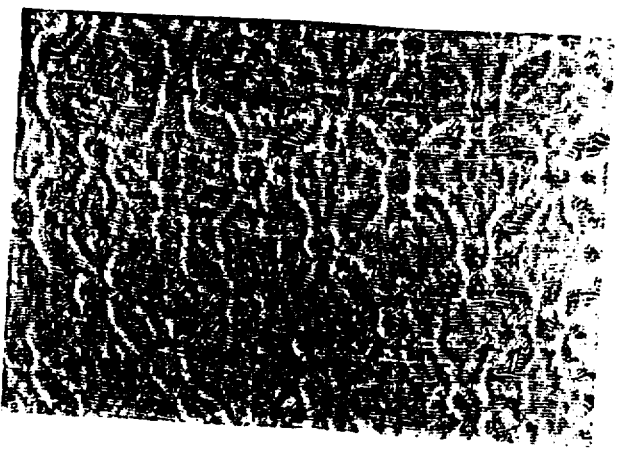
Figure 7B:
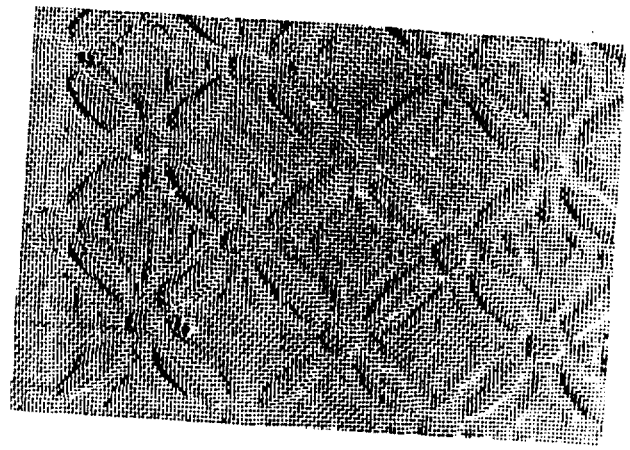
Figure 7C:
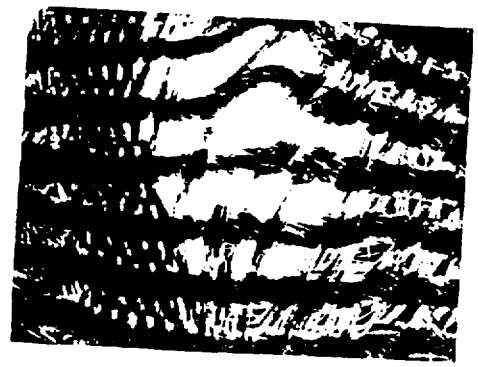
Figure 7D:
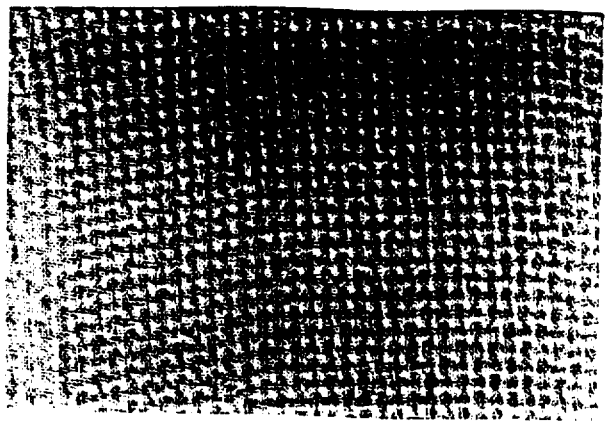
Figure 7E:
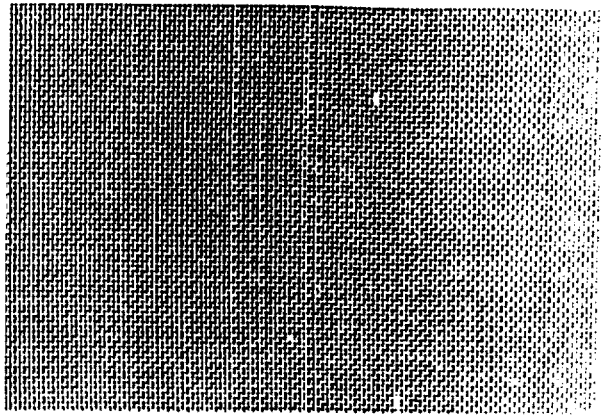
Figure 7F:
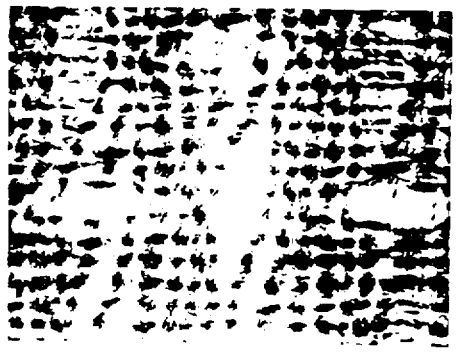
Figure 7G:
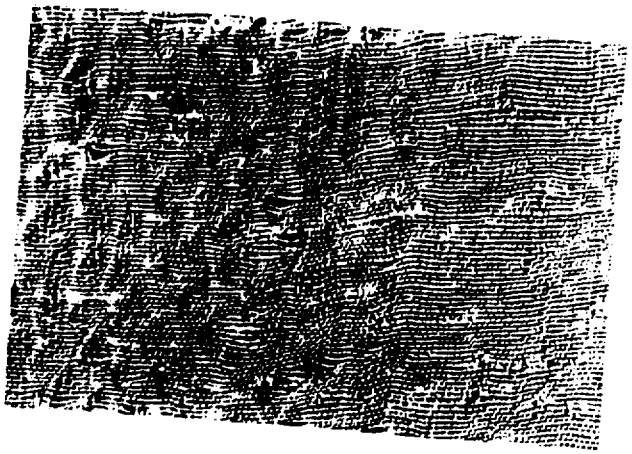
Figure 7H:
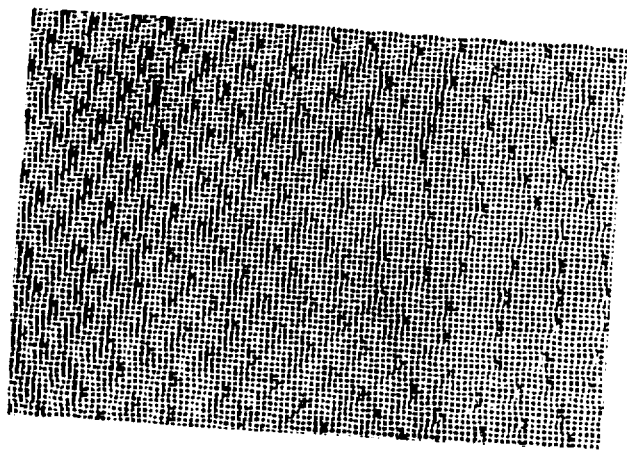
Figure 7I:
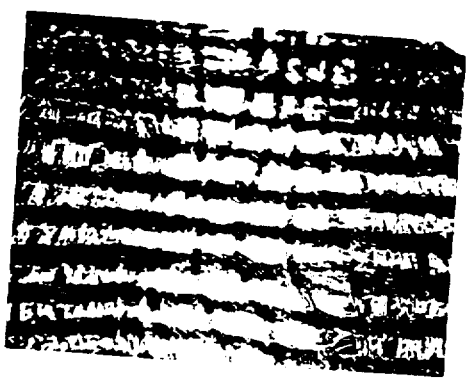
Figure 7J:
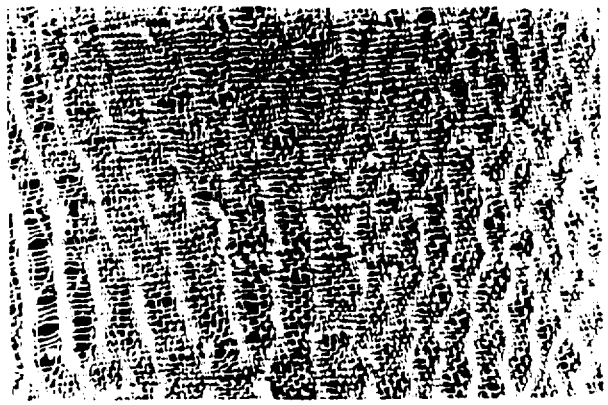
Figure 7K:
Figure 7L:
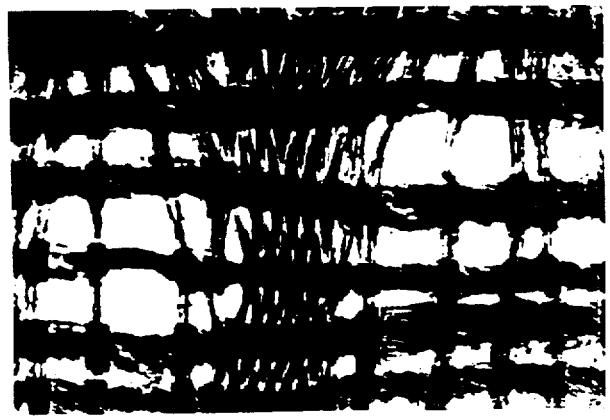

FIGS. 7A to 7L show samples of the displacement patterns obtained in fabrics with different patterned screens. In FIG. 7A, a blouse fabric made of polyester/rayon, having filament warp yarns of 76 ends/inch in the warp (machine) direction, and spun fill of 31 picks/inch in the cross direction, is patterned using the flower patterned screen shown in FIG. 7B. The photomicrograph of FIG. 7C shows a magnified view (16×) of the yarn displacement obtained. In FIG. 7D, a shirt fabric of 100% cotton, of 76 ends/inch by 68 picks/inch, is patterned using the woven mesh (20×20/inch) screen shown in FIG. 7E, with the displacement result shown magnified (16×) in FIG. 7F. In FIG. 7G, a seeded batiste fabric, composed of 92% polyester and 8% cotton fibers, of 90 ends/inch by 44 picks/inch, is obtained using the wavy lines/dots screen shown in FIG. 7H, with the displacement result shown magnified (16×) in FIG. 7I. FIG. 7J further shows the blouse fabric patterned with the wavy lines/dots screen of FIG. 7H, with the fiber displacement result shown magnified (16×) in FIG. 7K and (18×) in FIG. 7L.

Thus, the invention provides a method and apparatus for patterning fabrics by the use of one or more water curtains under pressure against a patterned screen. The pattern can be regularly repeated in the fabric and controlled for the desired effect. A wide range of patterned designs and visual effects can be obtained. The hydropatterning technique of the invention produces minimal wear and tear on the process equipment and on the fabric being processed. Furthermore, the production of caustic or chemical wastes is minimized, thereby lessening the impact of such fabric treatment processes on the environment.

A wide range of other patterning effects can be achieved by using different dyes, colors, dyeing processes, water curtain configurations, screen patterns, fabrics, and fabric weaves. The water curtain can be generated by other types and arrangements of nozzles and pressure manifolds. Woven, perforated, or expanded metal or plastic screens or other three-dimensional screens with raised and lowered areas can be used for the support surface to achieve the patterned effect. The hydrojet processing of the fabric can also employ additives, such as caustic agents and abrasives, if desired, and other types of fluids. Besides woven fabrics, other nonwoven, bonded, layered, gauze, or composite fabrics or laminates may be similarly hydropatterned in accordance with the principles of the invention.

Other modes of hydro-processing of fabrics may be devised in accordance with the principles of the invention disclosed herein. For example, columnar jets, offset manifolds, and other water curtain arrangements might be used with three-dimensional and other patterned support surfaces or with patterned stencils to obtain patterned visual effects in fabrics. A related example of hydroprocessing is PCT Application No. US/89/01592, filed on Apr. 13, 1989, by Veratec Corporation, entitled "Apparatus and Method For Hydroenhancing Fabric Properties", disclosing the use of hydroprocessing of fabric to improve fabric properties such as uniformity of yarn distribution, enhanced bloom, wear-resistance, anti-cupping, and anti-torquing. Additions or modifications to the basic hydro-processing line might also be used, for example, incorporating mechanical brushing or abrading, chemical additives, and post-treatment processing such as bonding, binder padding, finish treatments, stiffening, etc.

Other variations of structures, materials, products, and processes may of course be devised. All such variations, additions, and modifications are nevertheless considered to be within the spirit and scope of the present invention, as defined in the claims appended hereto.

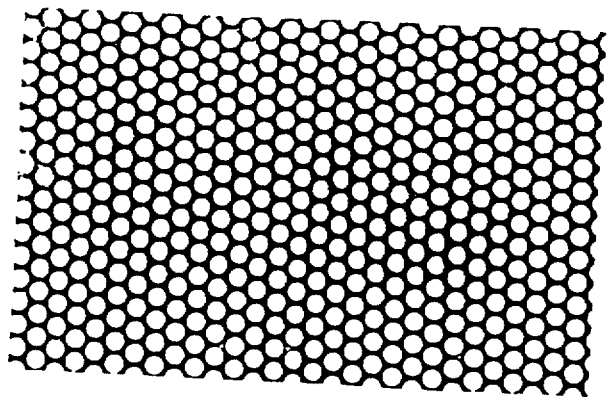
FIG. 6A
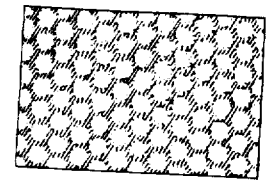
FIG. 6B
FIG. 6C
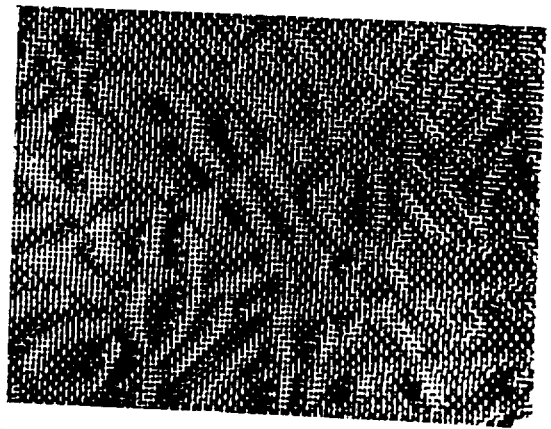
FIG. 6D
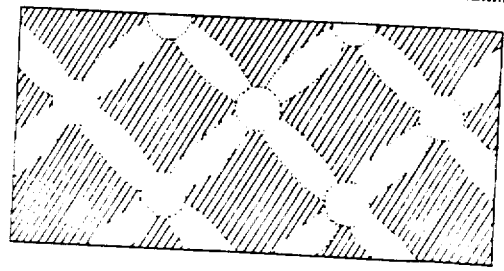

We claim:

1. An hydropatterning apparatus for producing a visual pattern in woven or bonded, nonwoven fabric comprising:

a conveyor for conveying a sheet of the woven or bonded, nonwoven fabric to a patterning station along a machine direction, the conveyor including a support surface formed with a pattern of raised or solid areas and lowered or void areas interspersed therein, wherein the fabric is placed flat in contact with the support surface as it is carried through the patterning station;

hydrojet means disposed above the conveyor for directing a curtain of fluid downwardly to impact on the fabric as it is moved through the patterning station on the support surface, wherein said fluid curtain is substantially continuous across the fabric, such that a visual property of the fabric becomes altered in correspondence to the pattern of raised or solid areas and lowered or void areas of the support surface due to the impact of the fluid curtain on the fabric against the patterned support surface, wherein said hydrojet means includes a manifold extending in a cross direction perpendicular to the machine direction having a plurality of nozzles spaced in the cross direction which eject divergent, fan sprays having an angle of divergence so as to provide overlapping jets of water forming said water curtain substantially evenly across the fabric.

2. An hydropatterning apparatus according to claim 1, wherein the conveyor is a belt conveyor driven on rollers.

3. An hydropatterning apparatus according to claim 1, wherein the conveyor is a cylindrical drum.

4. An hydropatterning apparatus according to claim 1, wherein the support surface has raised and lowered areas formed three-dimensionally therein.

5. An hydropatterning apparatus according to claim 1, wherein the support surface is formed from a plate having the void areas perforated therein.

6. An hydropatterning apparatus according to claim 1, wherein the hydrojet means includes a plurality of manifolds arranged in parallel spaced apart in the machine direction over the fabric.

7. An hydropatterning apparatus according to claim 1, wherein the nozzles have an angle of divergence of 18 degrees and are disposed about 1 to 10 inches above the conveyor.

8. An hydropatterning apparatus according to claim 1, wherein the hydrojet means employs a water pressure of about 1000 psi, and the conveyor conveys the fabric at a process speed of about 60 ft/min.

9. An hydropatterning apparatus according to claim 1, further comprising recovery means disposed beneath the support surface for recovering and recirculating fluid passed by the hydrojet means through the fabric.

10. An hydropatterning apparatus according to claim 1, wherein the conveyor and support surface include open areas for draining fluid from said hydrojet means downwardly therethrough.

11. A method for hydropatterning a visual pattern in a woven or bonded, nonwoven fabric, comprising the steps of:

conveying a sheet of the woven or bonded, nonwoven fabric along a machine direction supported on a support surface formed with a pattern of raised or solid areas and lowered or void areas interspersed therein;

directing a curtain of fluid downwardly to impact on the fabric as it is conveyed on the support surface, wherein said fluid curtain is substantially continuous across the fabric, such that a visual property of the fabric become altered in correspondence to the pattern of raised or solid areas and lowered or void areas of the support surface due to the impact of the curtain of fluid on the fabric against the support surface.

12. A method for hydropatterning fabric according to claim 11, wherein the fabric to be hydropatterned is dyed woven fabric which has a non-colorfast characteristic, and water is used as the fluid for subtractive color removal of dye from the fabric to obtain a washout effect.

13. A method for hydropatterning fabric according to claim 11, wherein the impact of fluid is used on fabric against a patterned support surface to obtain a fiber displacement effect in the fabric.

14. A method for hydropatterning fabric according to claim 11, wherein the fluid directing step includes providing a manifold extending in a cross direction perpendicular to the machine direction eject divergent, overlapping jets of water so that the resulting water curtain impacts substantially evenly across the fabric.

15. A method for hydropatterning fabric according to claim 14, wherein the fluid directing step includes providing a plurality of manifolds arranged in parallel spaced apart in the machine direction over the fabric.

16. A product produced by the method according to claim 11, wherein the fabric is dyed fabric, and is hydropatterned with a color pattern effect.

17. A product produced by the method according to claim 11, wherein the fabric is hydropatterned with a regularly repeating pattern.

18. A product produced by the method according to claim 11, wherein the fabric is hydropatterned with a fiber displacement effect.

19. A product produced by the method according to claim 11, wherein the fabric is indigo dyed denim, and is hydropatterned with a color washout pattern.

20. A product produced by the method according to claim 11, wherein the fabric is a light fabric of moderate size yarn, and is hydropatterned with a lace-like pattern.

* * * * *

UNITED STATES PATENT AND TRADEMARK OFFICE
CERTIFICATE OF CORRECTION

PATENT NO. : 4,995,151
DATED : February 26, 1991
INVENTOR(S) : Jodie M. Siegal, et al.

It is certified that error appears in the above-indentified patent and that said Letters Patent is hereby corrected as shown below:

The sheets of drawings consisting of figures 6A-7L, should be added as shown on the attached pages.

Signed and Sealed this

Thirtieth Day of November, 1993

Attest:

BRUCE LEHMAN

Attesting Officer

Commissioner of Patents and Trademarks

Figure 6E:
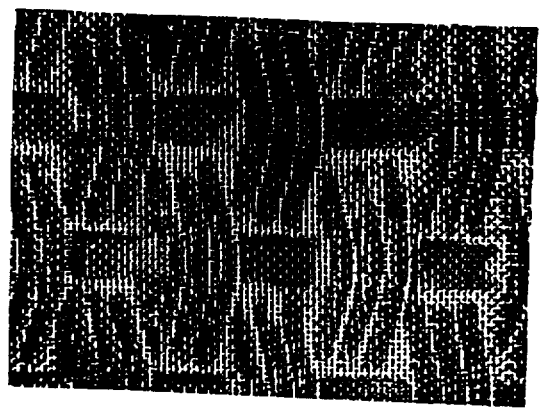
Figure 6F:
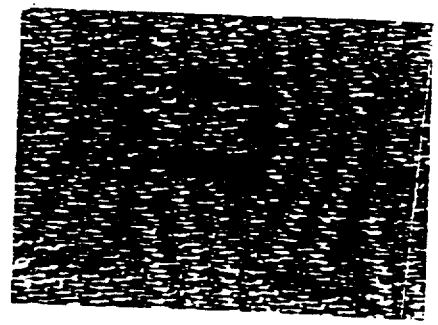
Figure 6G:
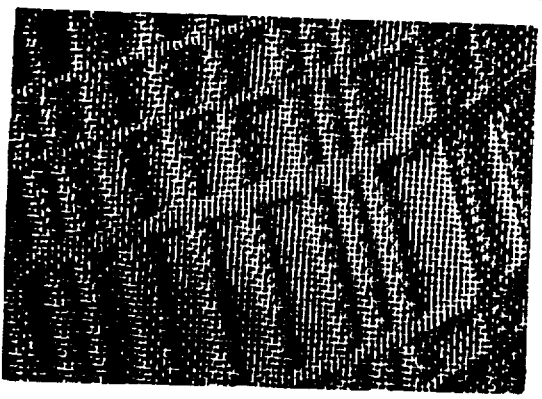
Figure 6H:
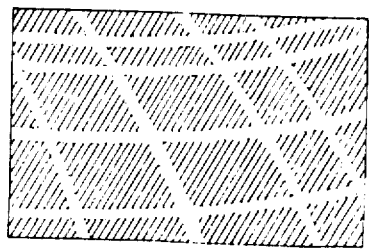
Figure 6I:
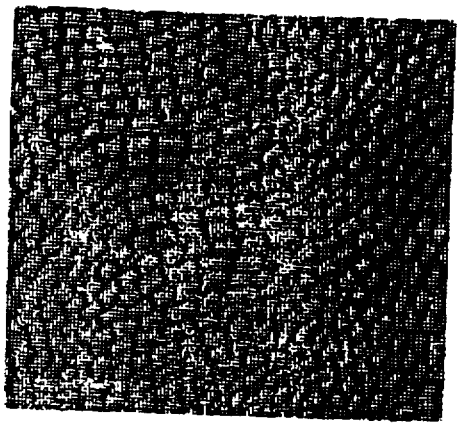
Figure 6J:
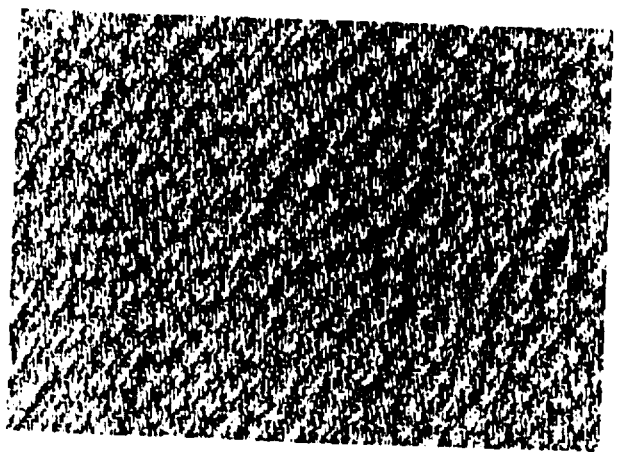
Figure 6K:
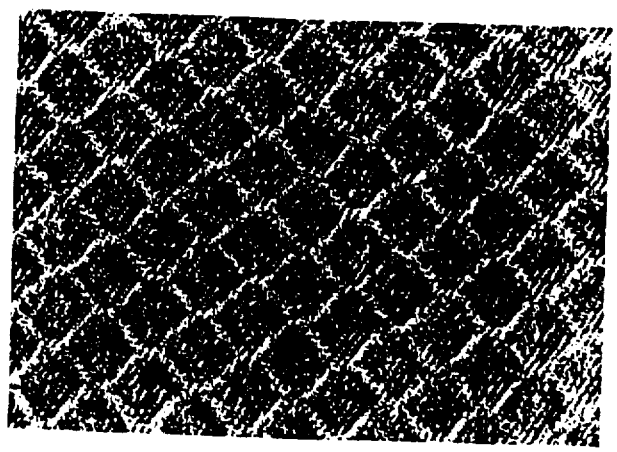

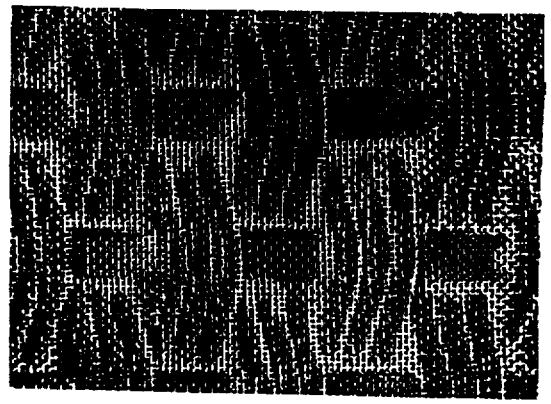
FIG. 6E
FIG. 6F
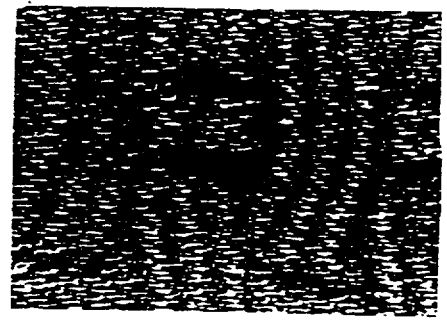
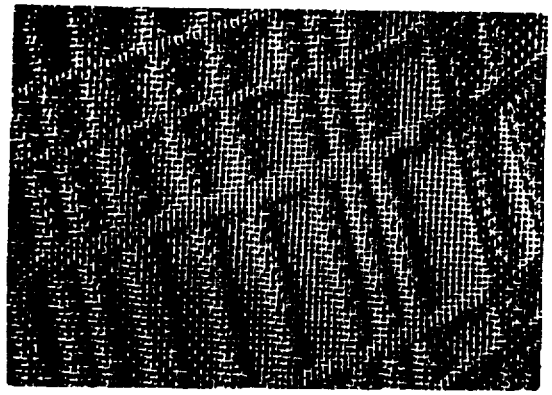
FIG. 6G
FIG. 6H
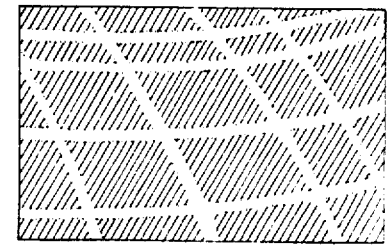

UNITED STATES PATENT AND TRADEMARK OFFICE
CERTIFICATE OF CORRECTION

PATENT NO. : 4,995,151  
DATED : February 26, 1991  
INVENTOR(S) : Jodie M. Siegal, et al.

Page 1 of 8

It is certified that error appears in the above-indentified patent and that said Letters Patent is hereby corrected as shown below:

The sheets of drawings consisting of figures 6A-7L, should be added as shown on the attached pages.

This certificate supersedes Certificate of Correction issued November 30, 1993.

Signed and Sealed this

Fifteenth Day of March, 1994

Attest:

BRUCE LEHMAN

Attesting Officer

Commissioner of Patents and Trademarks